US012714080B1

(12) United States Patent
Buck, II

(10) Patent No.: US 12,714,080 B1
(45) Date of Patent: Aug. 25, 2026

(54) ANGLING DEVICE AND ASSEMBLY

(71) Applicant: Keith Alan Buck, II, Newport, NC (US)

(72) Inventor: Keith Alan Buck, II, Newport, NC (US)

( * ) Notice: Subject to any disclaimer, the term of this patent is extended or adjusted under 35 U.S.C. 154(b) by 84 days.

(21) Appl. No.: 18/532,328

(22) Filed: Dec. 7, 2023

Related U.S. Application Data

(60) Provisional application No. 63/432,509, filed on Dec. 14, 2022.

(51) Int. Cl.
*A01K 87/00* (2006.01)

(52) U.S. Cl.
CPC .................................. *A01K 87/008* (2022.02)

(58) Field of Classification Search
CPC ...... A01K 87/08; A01K 87/008; A01K 97/08; A01K 97/10
See application file for complete search history.

(56) References Cited

U.S. PATENT DOCUMENTS

D363,529 S * 10/1995 Nordstrom ................... D22/139
5,503,579 A * 4/1996 Curran ................... A01K 87/00 43/25
5,592,773 A * 1/1997 Perry ..................... A01K 87/00 D22/139
5,862,622 A * 1/1999 Sandman ............. A01K 87/007 43/25
5,957,284 A * 9/1999 Caddell .................. A01K 97/08 206/315.11
6,357,639 B1 * 3/2002 Williams ............... A01K 97/10 224/245
D600,773 S * 9/2009 Hall ............................. D22/139
8,739,458 B1 * 6/2014 Michael ................. A01K 97/12 43/4.5
9,713,324 B1 * 7/2017 Stuart .................... A01K 97/06
9,723,822 B1 * 8/2017 Evans .................. A01K 87/007
11,317,613 B1 * 5/2022 Trees ...................... A01K 97/00
12,501,889 B1 * 12/2025 Kinion ................. A01K 87/008
2021/0009244 A1 * 1/2021 Hansen .................. A01K 29/00

* cited by examiner

*Primary Examiner* — William L Gmoser
(74) *Attorney, Agent, or Firm* — MacCord Mason PLLC

(57) ABSTRACT

A floating marine angling jacket. The floating jacket may include a flexible body, an elastomer layer, a flotation elongated portion, and a fastening member. The angling jacket may include a flexible neoprene layer, a first cross flotation member and a second cross flotation member, a distal Velcro fastening element and an opposing proximate Velcro fastening element, and a plurality of stitched peripheral edges.

4 Claims, 5 Drawing Sheets

ANGLING DEVICE AND ASSEMBLY

This application claims the benefit of U.S. provisional application No. 63/432,509, filed Dec. 14, 2022, which is incorporated herein by reference in its entirety.

FIELD OF THE TECHNOLOGY

The present disclosure relates generally to angling, and more particularly to improved angling and/or aquatic support features and assemblies.

BRIEF DESCRIPTION OF THE DRAWINGS

Embodiments of the disclosure will be better understood by a reading of the Description of Embodiments along with a review of the drawings, in which.

SUMMARY

Figure 1:
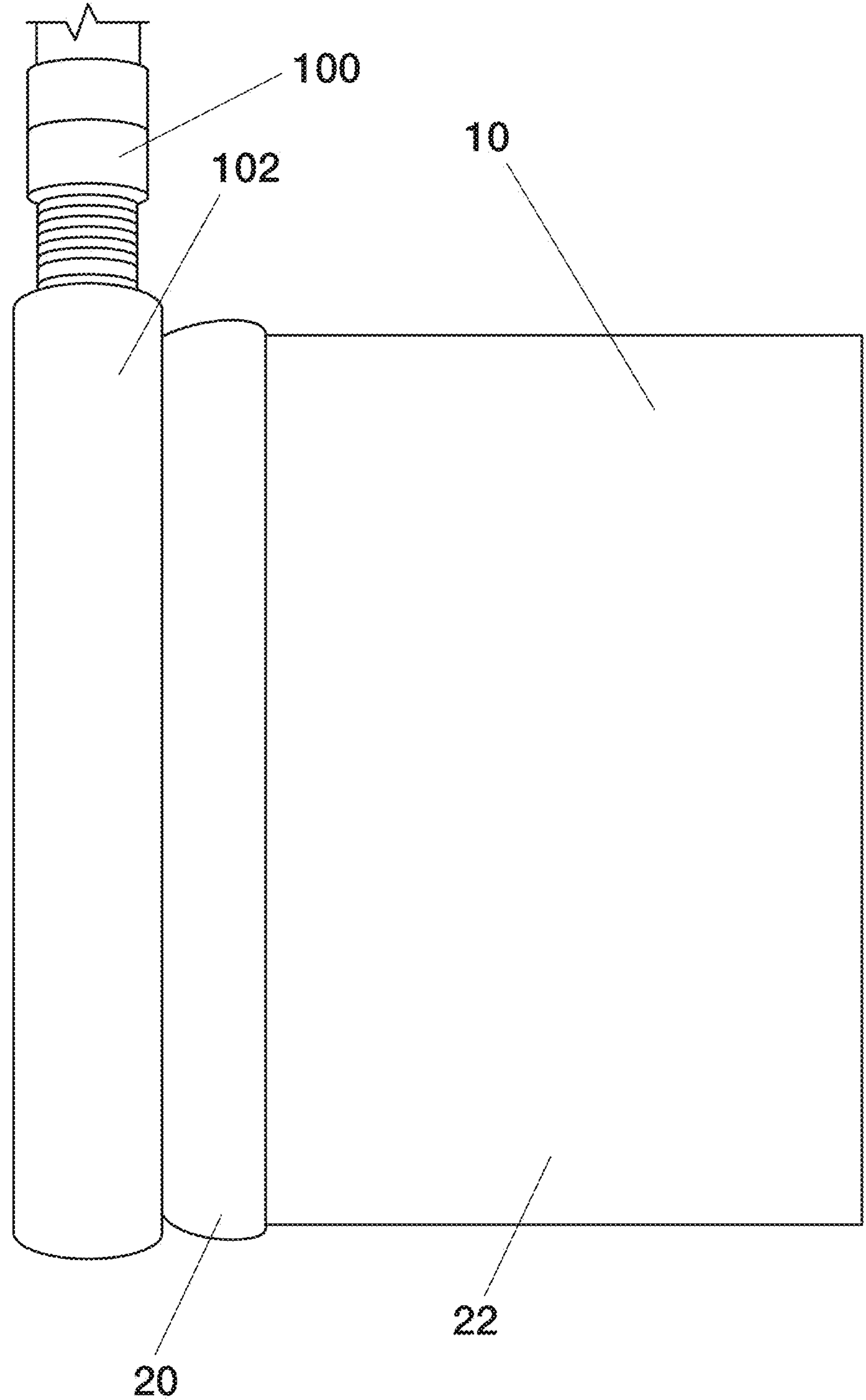
FIG. 1 is a side perspective view of one embodiment of an assembly according to the present disclosure in a partially exploded position.
Figure 2:
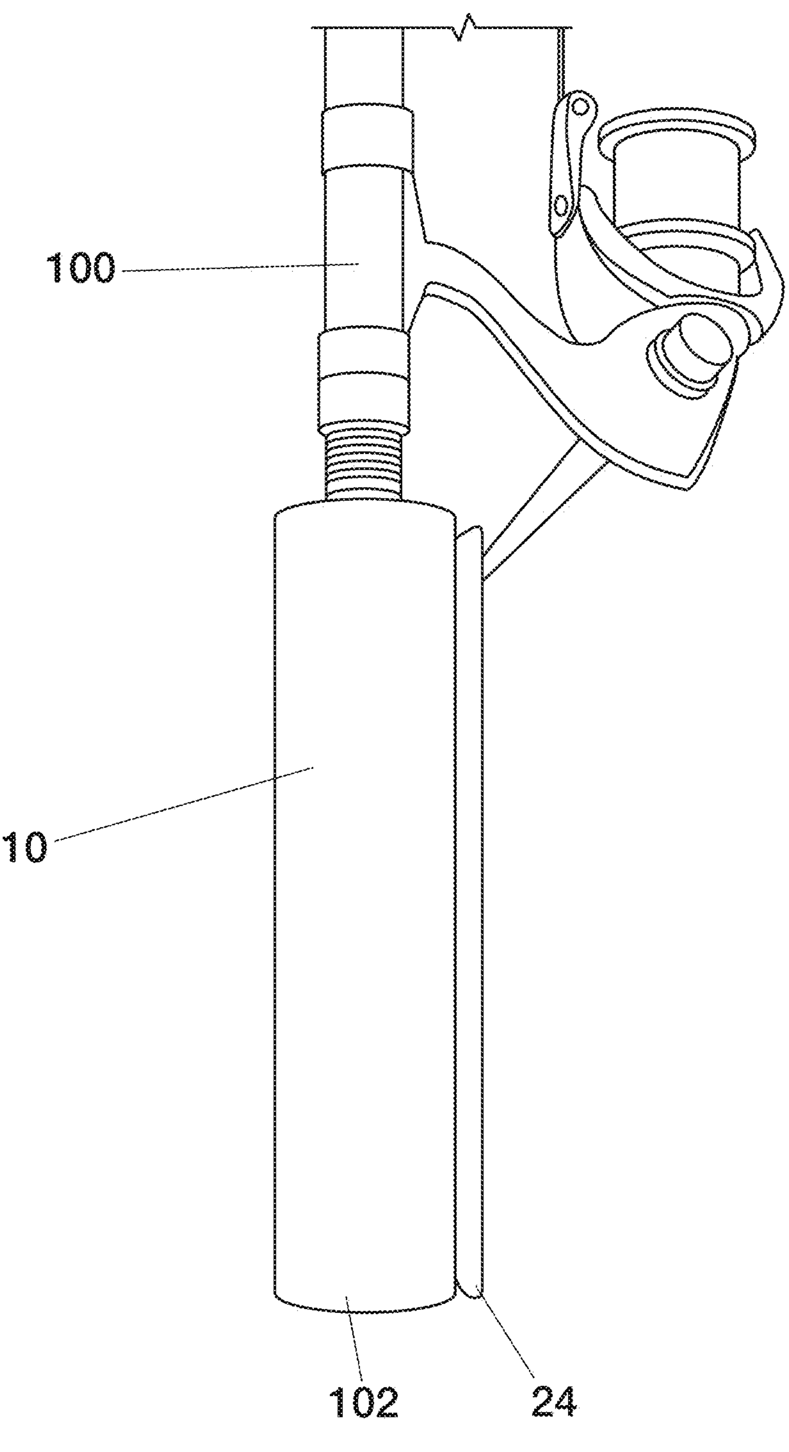
FIG. 2 is a side perspective view of the embodiment thereof in an operating position.
Figure 3:
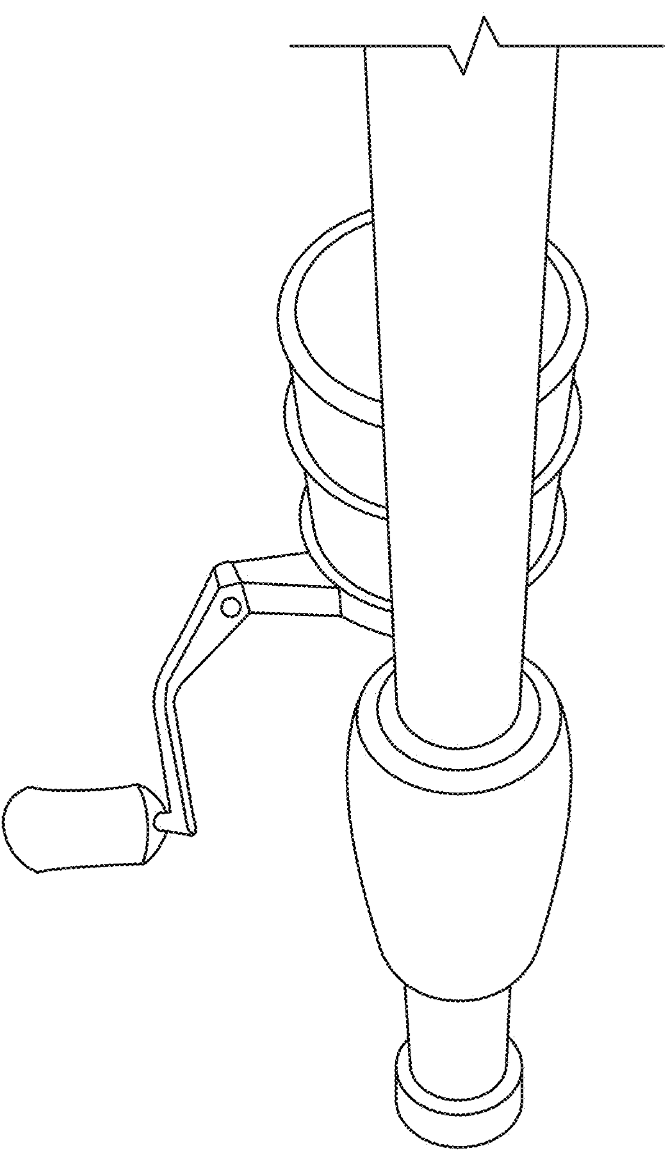
FIG. 3 is a top view of the embodiment thereof.
Figure 4:
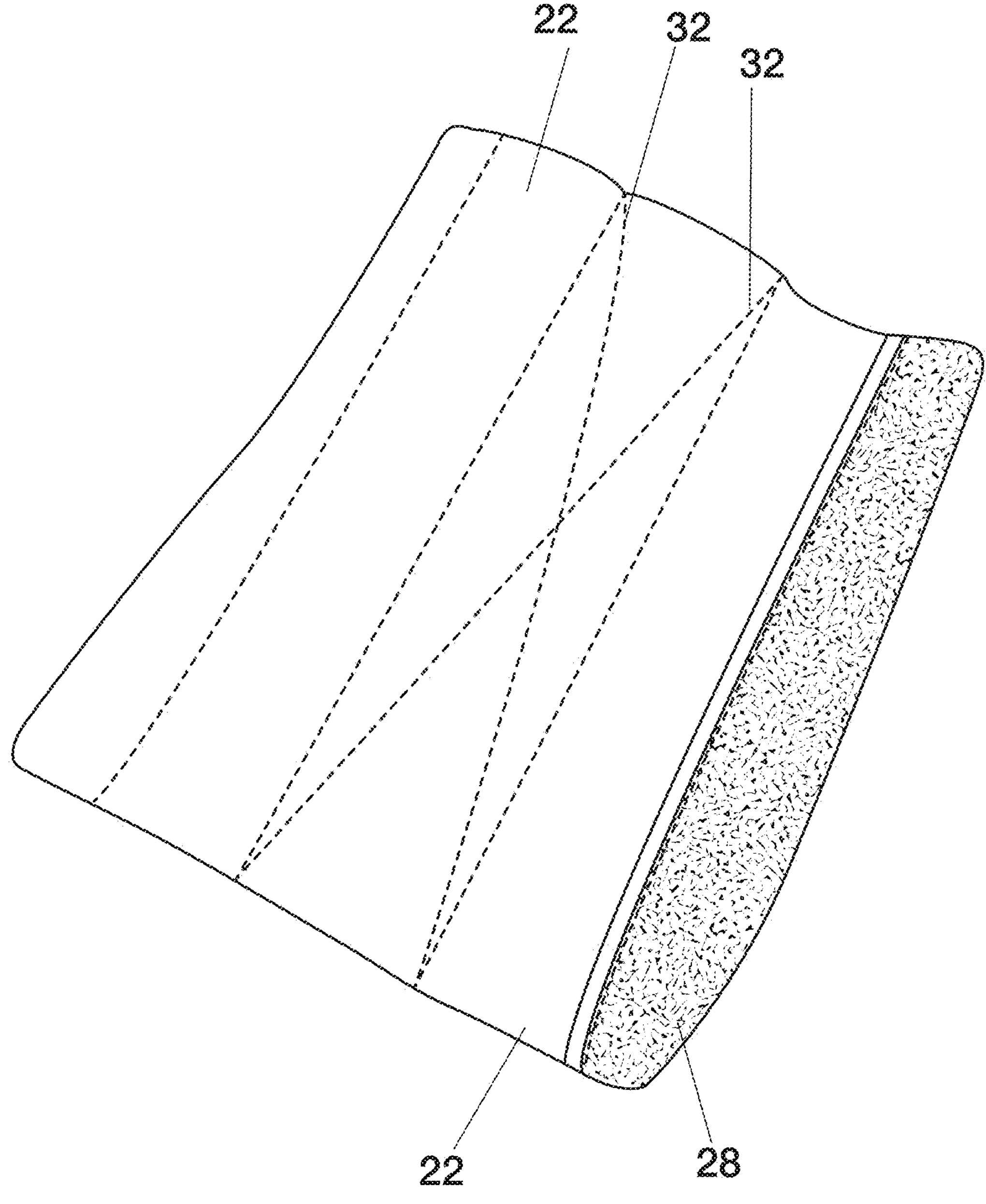
FIG. 4 is a front view of an isolated angling jacket embodiment thereof.

In accordance with the present disclosure, buoyancy and flotation support systems and assemblies are provided for a wide variety of angling and aquatic applications. This disclosure provides improved aquatic product features that are convenient, efficient, and safe for continued use in a variety of applications.

In one embodiment, an angling jacket system capable of floating an angling product on a water surface comprises a flexible synthetic rubber ("neoprene layer"); a first cross flotation member and a second cross flotation member; a distal nylon pile fabric ("Velcro fastening element") and an opposing proximate Velcro fastening element; and a plurality of stitched peripheral edges.

In one example, the flexible neoprene layer may include a first, second, third and fourth sides, the first and second sides opposing one another and the third and fourth sides opposing one another. The neoprene layer may have a thickness adapted to mate with a predetermined marine product to provide a predetermined buoyancy or flotation factor. The cross member may include a closed-cell extruded polystyrene foam ("Styrofoam component"). The angling jacket system may include an elastic securement. The angling jacket system may include a mechanical securement. The angling jacket system may include a fishing rod, a net, a gaff, a dip net, the like, and a combination thereof. The angling jacket system may operate independent of rod action.

In certain examples, the angling jacket system may include stitching securing elements. The angling jacket system may include a plurality of stitched peripheral edges. The angling jacket system may include a plurality of stitched internal compartments. The angling jacket system may include a customized stitching. The angling jacket system may include a reflective striping.

In one embodiment, an angling rod assembly comprises a fishing rod having a bottom handle adjacent a reel; and a flotation assembly removeably affixed to the handle and including a polychloroprene layer, a Styrofoam cross member secured about the polychloroprene layer, and a Velcro fastening layer affixed about the polychloroprene layer and substantially enclosing the bottom handle.

In one example, the flotation assembly may be adapted to define a channel to receive the bottom handle. The flotation assembly may include a first, second, third and fourth sides, the first and second sides opposing one another and the third and fourth sides opposing one another. The first cross flotation member may include a Styrofoam member, and a second cross flotation member comprises a Styrofoam member. The first cross member may extend in a generally perpendicular direction out of a horizontal plane; and wherein the second cross member extends in a generally perpendicular direction out of a horizontal plane. The rod assembly may include a distal Velcro fastening element and an opposing proximate Velcro fastening element.

In certain examples, the flotation assembly may operate independent of rod action. The rod assembly may include stitching securing elements. The rod assembly may include plurality of stitched peripheral edges. The rod assembly may include plurality of stitched internal compartments. The rod assembly may include a customized stitching. The rod assembly may include reflective striping.

In one embodiment, a floating marine device comprises a flexible body; an elastomer layer; a flotation elongated portion secured about the elastomer layer; and a fastening member secured about the elastomer layer, and wherein a channel is formed between a surface of the flexible body and adapted to receive and removeably mate with a shaft portion of a marine product.

In certain examples, the flexible body may include a first, second, third and fourth sides, the first and second sides opposing one another and the third and fourth sides opposing one another. The elastomer layer may include a component chosen from the group consisting of a neoprene layer, a nylon layer, a leather layer, a spandex layer, a rubber layer, and a combination thereof. The neoprene layer may have a thickness adapted to mate with a predetermined marine product. The elastomer layer may include a polychloroprene layer.

In certain examples, the flotation elongated portion may include at least one cross member adapted for a predetermined buoyancy. The cross member may include a Styrofoam member. The first cross flotation member may include a Styrofoam member, and the second cross flotation member comprises a Styrofoam member. The fastening member may include a Velcro portion. The device may include distal Velcro fastening element and an opposing proximate Velcro fastening element. The fastening member may include an elastic securement. The fastening member may include a mechanical securement.

In certain examples, the marine product includes a product chosen from the group consisting of a fishing rod, a net, a gaff, a dip net, the like, and a combination thereof. The device may operate independent of rod action. The rod assembly may include stitching securing elements. The rod assembly may include plurality of stitched peripheral edges. The rod assembly may include plurality of stitched internal compartments. The rod assembly may include a customized stitching. The rod assembly may include reflective striping.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

DESCRIPTION OF EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 5:
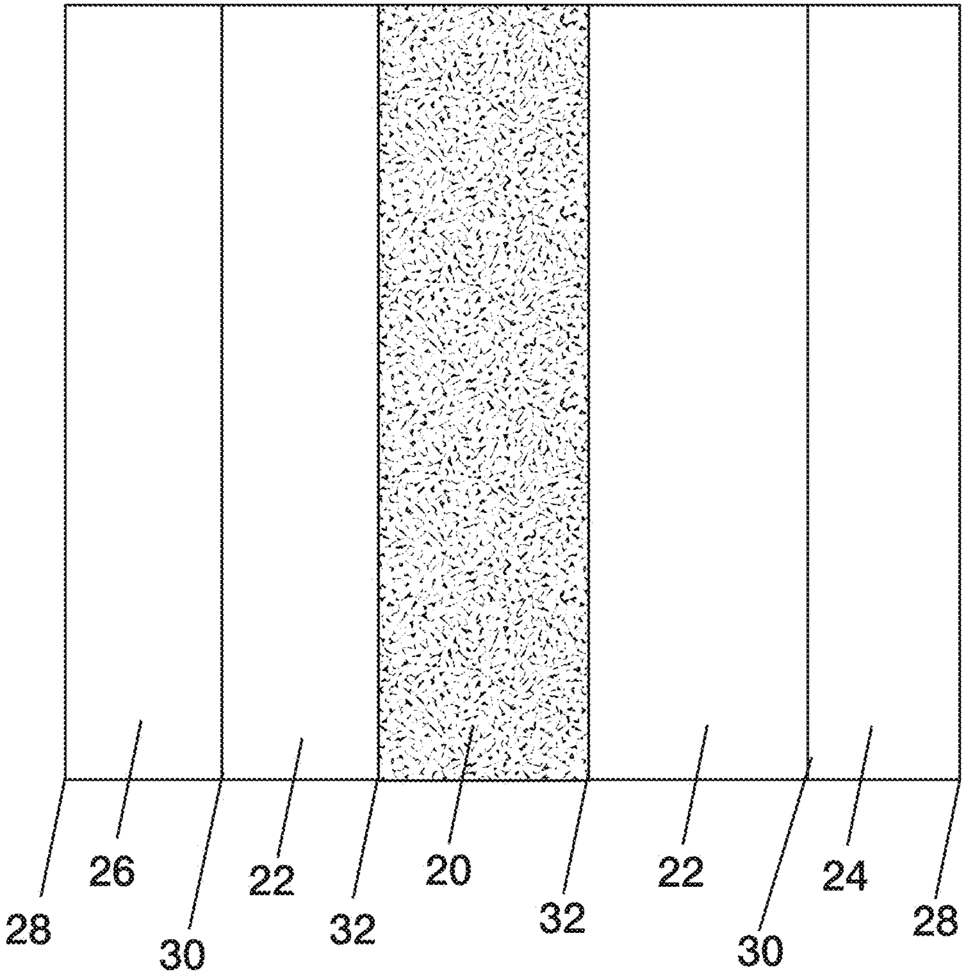
FIG. 5 is a schematic view thereof.

Referring now to the drawings in general, and FIGS. 1 and 5 in particular, it will be understood that the illustrations are for the purpose of describing embodiments of the disclosure and are not intended to limit the disclosure or any inventions thereto. As best seen in FIG. 1, device 10 and assemblies are shown embodied according to the present disclosure to provide improved angling flotation housing and the like. Those skilled in the art having the benefit of this disclosure will appreciate any combination of elements and examples herein within the spirit of this disclosure.

As seen in the various figures, a floating marine device 10 may include a flexible body 22; a flotation elongated portion 20 that is generally secured about elastomer layer 22; and a fastening member 26. As illustrated, a channel is formed between a surface of the flexible body 22 to receive and removeably mate with a shaft portion of a marine product to support any aesthetically-pleasing, convenient, and safe assembly, and the like, to provide the improvements shown and described herein.

As illustrated, an angling rod assembly comprises a fishing rod 100 having a bottom handle 102 adjacent a reel; and a flotation assembly 10 that is removeably affixed to handle 102. In certain examples, the flotation assembly 10 that is removeably affixed to adjacent the reel, and the like. The angling jacket system 10 may include a polychloroprene layer 22, a Styrofoam cross member 20 that is secured about polychloroprene layer 22, and a Velcro fastening layer 24, 26 affixed about polychloroprene layer 22 and substantially enclosing the bottom handle 102 in an operating position. Further, those skilled in the art having the benefit of this disclosure will recognize additional angling rod assembly feature and fishing rod elements useful for the examples and embodiments herein.

In one example, the flotation assembly may be adapted to define a channel to receive the bottom handle 102. The flotation assembly may include a first, second, third and fourth sides, the first and second sides opposing one another and the third and fourth sides opposing one another, while those skilled in the art having the benefit of this disclosure will recognize additional designs and geometric orientations. Further, the first cross flotation member may include a Styrofoam member, and a second cross flotation member comprises a Styrofoam member. The first cross member may extend in a generally perpendicular direction out of a horizontal plane; and wherein the second cross member extends in a generally perpendicular direction out of a horizontal plane. The rod assembly may include a distal Velcro fastening element and an opposing proximate Velcro fastening element. The flotation assembly may operate independent of rod action. The rod assembly may include stitching securing elements 30, 32. The rod assembly may include plurality of stitched peripheral edges 28. The rod assembly may include plurality of stitched internal compartments. The rod assembly may include a customized stitching. The rod assembly may include reflective striping.

In certain examples, the flexible neoprene layer may include a first, second, third and fourth sides, the first and second sides opposing one another and the third and fourth sides opposing one another. The neoprene layer may have a thickness adapted to mate with a predetermined marine product. The cross member may include a Styrofoam component. The angling jacket system may include an elastic securement. The angling jacket system may include a mechanical securement. The angling jacket system may include a fishing rod, a net, a gaff, a dip net, the like, and a combination thereof. The angling jacket system may operate independent of rod action.

In certain examples, the flotation elongated portion may include at least one cross member adapted for a predetermined buoyancy. The cross member may include a Styrofoam member. The first cross flotation member may include a Styrofoam member, and the second cross flotation member comprises a Styrofoam member. The fastening member may include a Velcro portion. The device may include distal Velcro fastening element and an opposing proximate Velcro fastening element. The fastening member may include an elastic securement. The fastening member may include a mechanical securement. Further, the marine product includes a product chosen from the group consisting of a fishing rod, a net, a gaff, a dip net, the like, and a combination thereof.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A floating marine device to support a shafted marine accessory, said device comprising:

a. a flexible body, wherein said flexible body having a first, second, third and fourth sides, said first and second sides opposing one another and said third and fourth sides opposing one another;

b. an elastomer layer secured to at least a surface of said flexible body;

c. a flotation elongated portion secured about said elastomer layer, and having a first cross flotation member and a second cross flotation member, wherein said first cross flotation member extending in a generally perpendicular direction out of a horizontal plane defined by the flexible body, and said second cross flotation member extending in a generally perpendicular direction out of said horizontal plane and adapted for a predetermined buoyancy; and d. a fastening member secured about said elastomer layer, said fastening member comprising a distal hook and loop fastener element and an opposing proximate hook and loop fastener element adapted to cinch around said shafted marine accessory; and e. a channel formed adjacent a surface of said flexible body and said elastomer layer, said channel being adapted to receive and removably mate with a shaft portion of said shafted marine accessory, and wherein said device being operable to float said shafted marine accessory on a water surface independent of an external rod action.

2. The device of claim 1, including stitching securing elements forming internal compartments.

3. The device of claim 1, including a stitching that is tailored in pattern to accommodate a specific marine accessory.

4. The device of claim 1, including reflective striping.

* * * * *